UNITED STATES PATENT OFFICE.

SAMUEL B. CHAMBERS, OF CHICAGO, ILLINOIS.

PROCESS FOR PRODUCING LAUNDRY STARCH.

1,276,722.  Specification of Letters Patent.  Patented Aug. 27, 1918.

No Drawing.  Application filed December 1, 1916. Serial No. 134,432.

*To all whom it may concern:*

Be it known that I, SAMUEL B. CHAMBERS, a citizen of the United States, residing at Chicago, in the county of Cook and State of Illinois, have invented a certain new and useful Process for Producing Laundry Starch, of which the following is a specification.

This invention relates to a method of producing starch especially adapted for use in laundry, and similar work, and has for its object the production of a substance of this character which shall be more economical in the manufacture and more efficient in use than similar substances previously known.

The invention is exemplified in the steps of the process described in the following specification, and it is more particularly pointed out in the appended claims.

The basis or principal ingredient for the starch produced by the present invention is the present well known form of starch produced from maize or Indian corn, and may be either of the form known to the trade as pearl corn starch, or powdered corn starch. This should be distinguished from the product known as corn starch which is especially prepared for table use, the form of starch used for the steps of this invention being the starch as it is extracted from the corn by methods well known in the art before it is subjected to treatment preparing it for special purposes.

In carrying out the process of this invention, the pearl or powdered starch is placed in an agitator or stirrer, and to this starch is added substantially pure borax (sodium borate) in the proportion of fifteen ounces borax to one-hundred pounds of starch. At the same time in a separate receptacle water is placed to an amount equal to approximately fifty per cent. by weight of the amount of starch used, a working formula being six gallons or forty-eight pounds of water to each one-hundred pounds of starch. To this water is added chemically pure nitric acid, and for best results this acid should be sufficiently pure to show a specific gravity of one and forty-two one-hundredths (1.42); the proportion of acid used is preferably six ounces of acid for each one-hundred pounds of starch. After the borax and starch have been thoroughly mixed together in the agitator and the acid mixed with the water, the water is permitted to flow into the agitator through a pipe or spray while the agitator continues to operate, the mixing process being continued until the water and acid are thoroughly mixed with the starch and borax. After the mixing is complete, the resulting substance is permitted to stand from twenty-four to forty-eight hours, depending upon temperature and weather conditions, to permit the proper action of the ingredients upon one another, the process being known as curing. The length of time required for this curing process will be shorter in warm weather than it is in cold, and during this period the mixture should be stirred or agitated at least once every twenty-four hours, and if the weather is warm, it should be stirred twice in twenty-four hours. This stirring prevents overheating due to fermentation. The amount of water in the mixture is not sufficient to make it liquid or semi-liquid during this curing process, but the consistency is such that if a quantity of the mixture be compressed in the hand it will not easily form a ball, but the amount compressed will fall apart to some extent and appear somewhat mealy in its nature.

After the curing process, the substance is dried either in a drier in which the substance is agitated during drying, or in a drier in which the substance is allowed to remain stationary and subject to currents of air or vacuum treatment. The well known forms of driers used in starch manufacture at the present time may be used for this purpose. During the drying process the temperature for best results should not be raised above 155° Fahrenheit, and may be as low as 130° Fahrenheit. If, however, it is desired to produce a thinner boiling starch for other purposes, such as a sizing starch, a temperature greater than 155° may be used and the advantages of the other steps of the process will still be secured. The drying process is continued until the moisture is removed and the resulting substance is in the form of dry powder.

It has been found by repeated experiments that laundry starch made according to this process is of far superior quality to any of the starches previously known. One characteristic of this starch is its ability to penetrate into every fiber of the fabric to which it is applied. A second characteristic is the pliability and toughness imparted to the fabric and the absence of any tendency to cause breaking or cracking.

Having thus described my invention, what I claim as new and desire to secure by United States Letters Patent is:

1. The process of treating starch comprising the steps of subjecting the starch to a solution containing nitric acid and subsequently removing moisture from the mixture thus formed by evaporation.

2. The process of treating starch comprising the steps of subjecting the starch to a solution containing nitric acid substantially in the proportion of six ounces of nitric acid to one-hundred pounds of starch and subsequently drying the mixture at a temperature between 130° and 155° Fahrenheit.

3. The process of treating starch comprising the steps of subjecting the starch to a solution of chemically pure nitric acid in water.

4. The process of treating starch comprising the steps of subjecting the starch to a solution of chemically pure nitric acid in water the proportion being six ounces of nitric acid and approximately six gallons of water to each one-hundred pounds of starch.

5. The process of treating starch comprising the steps of subjecting a mixture of starch and sodium borate to a solution of nitric acid in water.

6. The process of treating starch comprising the steps of subjecting a mixture of starch and sodium borate in the proportion of one-hundred pounds of starch to fifteen ounces of sodium borate to the action of a solution of nitric acid in water in the proportion of six ounces of nitric acid and approximately six gallons of water to each one-hundred pounds of starch.

7. The process of treating starch comprising the steps of subjecting the starch to the action of borax, nitric acid and water.

8. The process of treating starch comprising the steps of subjecting the starch to the action of a solution of nitric acid in water and thereafter permitting the starch to cure.

9. The process of treating starch comprising the steps of subjecting starch to the action of borax, nitric acid and water and thereafter permitting the starch to cure.

10. The process of treating starch comprising the steps of subjecting the starch to the action of borax, nitric acid and water, and thereafter drying the mixture to remove moisture.

11. The process of treating starch comprising the steps of subjecting the starch to the action of borax, nitric acid and water, thereafter permitting the starch to cure during which curing the mixture is stirred at intervals to prevent excessive heating.

12. The process of treating starch comprising the steps of mixing the starch with borax and adding thereto a solution of nitric acid in water, thereafter permitting the resulting mixture to cure for a period of time from twenty-four to forty-eight hours during which period the mixture is stirred at intervals to prevent excessive heating and finally drying the mixture at a temperature of from 130 to 155° Fahrenheit.

13. The process of treating starch comprising the steps of subjecting starch which has been derived from maize or Indian corn to the action of borax, nitric acid and water, thereafter permitting the mixture to cure for a period of from twenty-four to forty-eight hours during which period it is stirred at intervals to prevent excessive heating and finally drying the resulting mixture at a temperature of from 130 to 155° Fahrenheit.

14. The process of treating starch comprising the steps of adding to substantially dry starch powdered borax in the proportion of fifteen ounces of borax to one-hundred pounds of starch, thoroughly mixing the two together, adding to the mixture a solution of chemically pure nitric acid in water in the proportion of six ounces of acid and six gallons of water to one-hundred pounds of starch, thoroughly mixing the starch, borax, acid and water, afterward permitting the mixture to cure for a period of from twenty-four to forty-eight hours during which time it is stirred at intervals to prevent excessive heating and finally drying the mixture at a temperature of from 130 to 155° Fahrenheit.

15. The process of treating starch comprising the steps of subjecting a mixture of starch and sodium borate to a solution of nitric acid in water and subsequently drying the mixture by evaporation.

16. The process of treating starch comprising the steps of mixing the starch with sodium borate, separately mixing nitric acid with water, thoroughly mixing the two mixtures thus formed and subsequently drying the resulting mixture.

17. The process of treating starch comprising the steps of subjecting a mixture of starch and sodium borate to a solution of nitric acid in water in proportion to produce a moist but not a saturated mixture and thereafter drying the mixture at a temperature between 130° and 155° Fahrenheit.

18. The process of treating starch comprising the steps of subjecting a mixture of starch and sodium borate to a solution of nitric acid in water and subsequently drying the moisture from said mixture by subjecting it to a temperature not exceeding 155° Fahrenheit.

19. The process of treating starch comprising the steps of subjecting the starch to the action of acid and borax and subsequently drying the mixture by evaporation.

20. The process of treating starch comprising the steps of subjecting a mixture of starch and sodium borate to a solution of acid in water permitting the mixture thus formed to stand for curing and finally drying the mixture by evaporation.

21. The process of treating starch comprising the steps of subjecting a mixture of starch and sodium borate to a solution of acid in water permitting the mixture thus formed to stand for curing and subsequently drying the mixture by evaporation, the temperature at all times during the process being kept below 155° Fahrenheit.

22. The process of treating starch comprising the steps of first mixing the starch with powdered borax, then thoroughly mixing with the substance thus formed a solution of acid in water the proportion of liquid being sufficient to form a moist but not a saturated mixture and thereafter drying the mixture by evaporation, the temperature at all times during the process being kept below 155° Fahrenheit.

23. The process of treating starch comprising the steps of first mixing the starch with powdered borax, then thoroughly mixing with the substance thus formed a solution of acid in water the proportion of liquid being sufficient to form a moist but not a saturated mixture, permitting the liquid thus formed to stand for curing and finally drying the mixture by evaporation, the temperature at all times during the process being kept below 155° Fahrenheit.

24. The process of producing laundry starch which consists in adding to substantially dry starch in the form in which it is derived from Indian corn for commercial use, and known to the trade as pearl or powdered starch, powdered borax in the proportion of fifteen ounces of borax to one hundred pounds of starch; mixing the two together; adding to the mixture a solution of nitric acid in water, in the proportion of six ounces of acid and six gallons of water to one hundred pounds of starch; mixing the starch, borax, acid and water; permitting the mixture to cure for a period of from twenty-four to forty-eight hours during which time it is stirred at intervals to prevent excessive heating; and finally drying the mixture at a temperature of from 130° to 155° Fahrenheit.

In testimony whereof I have signed my name to this specification.

SAMUEL B. CHAMBERS.